United States Patent [19]

Shibayama et al.

[11] Patent Number: 4,724,727
[45] Date of Patent: Feb. 16, 1988

[54] HYDRAULIC CONTROL SYSTEM FOR AUTOMATIC TRANSMISSION

[75] Inventors: Takashi Shibayama, Chigasaki; Kazuhiko Sugano, Yokohama, both of Japan

[73] Assignee: Nissan Motor Co., Ltd., Yokohama, Japan

[21] Appl. No.: 655,433

[22] Filed: Sep. 28, 1984

[30] Foreign Application Priority Data

Oct. 7, 1983 [JP] Japan .................................. 58-187081

[51] Int. Cl.⁴ .............................................. B60K 21/00
[52] U.S. Cl. ..................................................... 74/867
[58] Field of Search .......................... 74/869, 868, 867

[56] References Cited

U.S. PATENT DOCUMENTS

| | | | |
|---|---|---|---|
| 3,656,373 | 4/1972 | Shimosaki | 74/869 |
| 3,707,890 | 1/1973 | Ito | 74/868 |
| 3,710,638 | 1/1973 | Sakai | 74/867 X |
| 3,728,915 | 4/1973 | Clark | 74/868 |
| 3,792,763 | 2/1974 | Enomoto | 74/869 |
| 3,832,915 | 9/1974 | Hiramatsu | 74/869 |
| 3,896,685 | 7/1975 | Shellman | 74/867 |
| 4,050,332 | 9/1977 | Taga | 74/869 |
| 4,188,839 | 2/1980 | Kubo et al. | 74/869 |
| 4,325,271 | 4/1982 | Iwanaga et al. | 74/869 |
| 4,413,536 | 11/1983 | Whitney et al. | 74/869 |
| 4,446,759 | 5/1984 | McCrary | 74/867 |
| 4,476,745 | 10/1984 | Moan | 74/868 X |
| 4,476,747 | 10/1984 | Kawamoto | 74/869 |

FOREIGN PATENT DOCUMENTS

| | | |
|---|---|---|
| 0103751 | 3/1984 | European Pat. Off. . |
| 0116898 | 8/1984 | European Pat. Off. . |
| 2153907 | 5/1973 | Fed. Rep. of Germany . |
| 131458 | 5/1983 | Japan . |
| 2029522 | 3/1980 | United Kingdom ............ 74/869 |
| 2108604 | 5/1983 | United Kingdom . |

*Primary Examiner*—Lawrence J. Staar
*Attorney, Agent, or Firm*—Schwartz, Jeffery, Schwaab, Mack, Blumenthal & Evans

[57] ABSTRACT

A hydraulic control system according to the present invention which features in providing an orifice fluidly disposed in a passage that allows fluid supply of hydraulic fluid pressure to a clutch in selecting a forward drive range from a neutral range and in shifting between speed ratios involving engagement of the clutch in the forward drive range, and an orifice control valve having means for providing a one-way flow bypass passage bypassing the orifice in selecting the forward drive range from the neutral range and selecting the neutral range from the forward drive range, and providing a restricted flow bypass passage bypassing the orifice in shifting between speed ratios involving engagement of the clutch. The one-way flow bypass passage prevents fluid flow therethrough toward the clutch.

4 Claims, 7 Drawing Figures

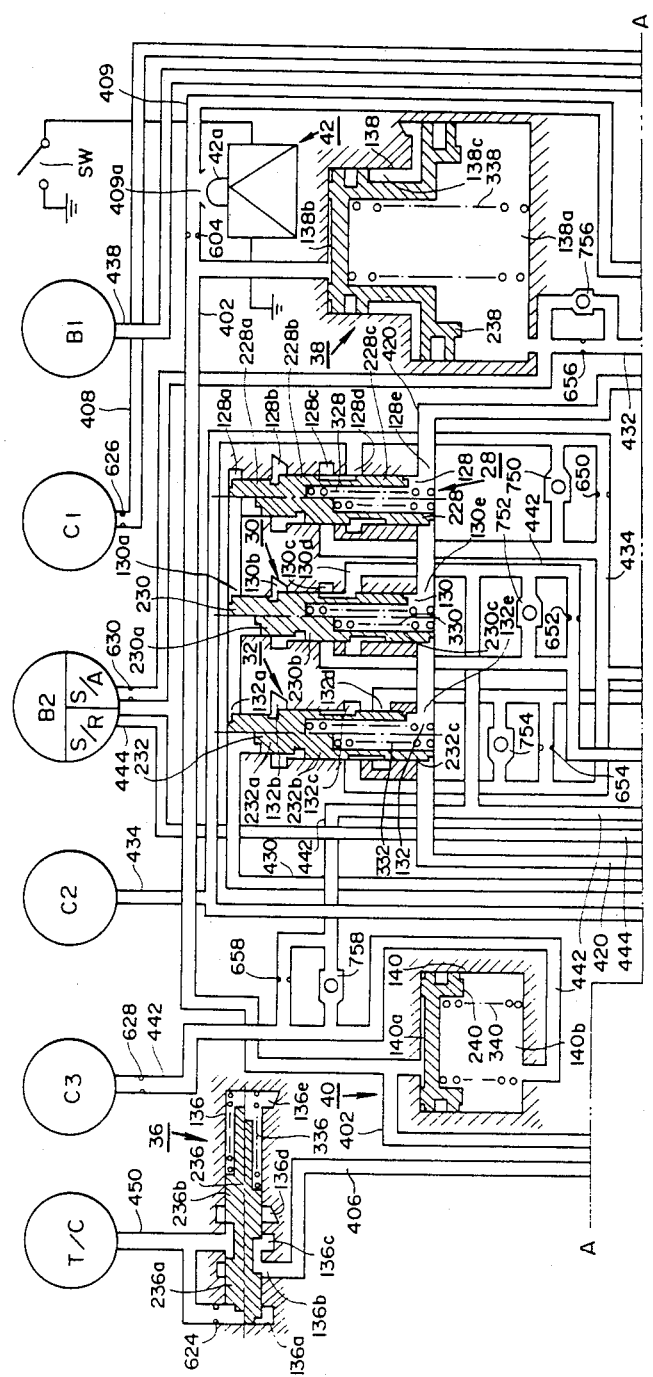

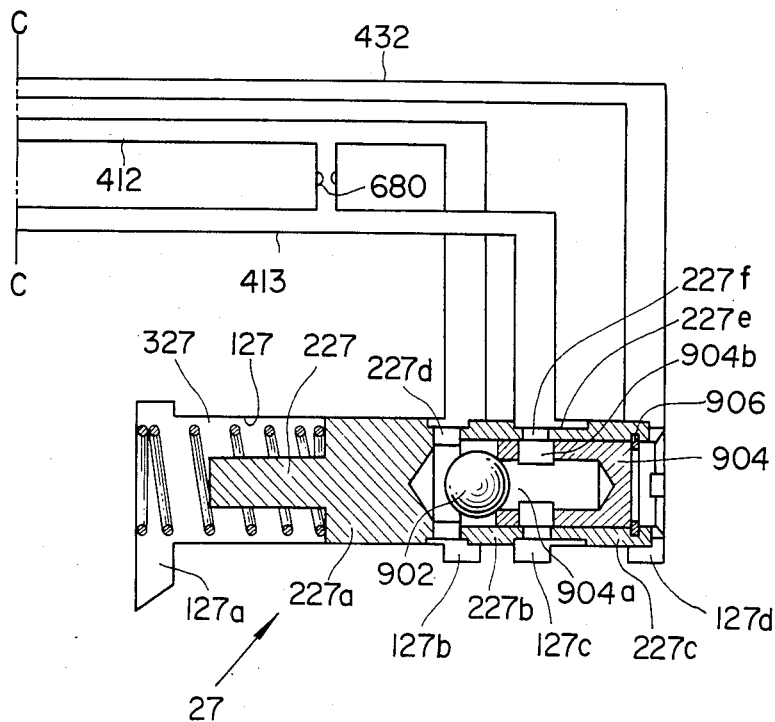

HYDRAULIC CONTROL SYSTEM FOR AUTOMATIC TRANSMISSION

RELATED COPENDING APPLICATIONS

The following copending applications have been assigned to the common assignee of the present application and related thereto.

(1) U.S. patent application Ser. No. 518,413, filed July 29, 1983 now U.S. Pat. No. 4,563,918 issued on Jan. 14, 1986;

(2) U.S. patent application Ser. No. 518,540, filed July 29, 1983 now U.S. Pat. No. 4,539,870 issued on Sept. 10, 1985;

(3) U.S. patent application Ser. No. 518,681, filed July 29, 1983 now U.S. Pat. No. 4,532,829;

(4) U.S. patent application Ser. No. 518,745, filed July 29, 1983 now U.S. Pat. No. 4,579,020;

(5) U.S. patent application Ser. No. 518,746, filed July 29, 1983 now U.S. Pat. No. 4,566,355 issued on Jan. 28, 1986;

(6) U.S. patent application Ser. No. 581,507, filed Feb. 17, 1984;

(7) U.S. patent application Ser. No. 581,508, filed Feb. 17, 1984;

(8) U.S. patent application Ser. No. 581,506, filed Feb. 17, 1984 now U.S. Pat. No. 4,555,964 issued on Dec. 3, 1985; and (9) U.S. patent application Ser. No. 581,509, filed Feb. 17, 1984.

BACKGROUND OF THE INVENTION

The present invention relates to a hydraulic control system for an automatic transmission.

In an automatic transmission, it is the common practice to gradually engage a clutch to be applied for establishing a first forward speed ratio thereby to alleviate shocks in selecting D range from N range. Practically, an orifice is provided in a passage via which a hydraulic fluid pressure is supplied to the clutch to be engaged during operation with the first forward speed ratio, thereby to provide a gradual rise in the hydraulic fluid pressure supplied to this clutch (see a hydraulic control system disclosed in Japanese Patent Application Provisional Publication No. 55-24223 for example). If the engagement of this clutch is maintained over all of the forward speed ratios, it is sufficient to set the orifice to a size suitable for coping with shocks taking place in selecting D range from N range. However, if this clutch is to be released for establishing at least one forward speed ratio other than the first forward speed ratio, setting, as above, the orifice to the size suitable for coping with the select shocks poses another problem. In the case where there is a clutch which is kept engaged during operation with a first, a second and a third forward speed ratio, but released during operation with a fourth forward speed ratio as in the four forward speed automatic transmission disclosed in Japanese Patent Application Provisional Publication No. 56-94053, if an orifice provided in a passage via which hydraulic fluid pressure is supplied to this clutch is set to a size suitable for providing a relatively large throttle effect (i.e., an orifice with a small flow cross sectional area) to cope with select shocks, engagement of this clutch is delayed in shifting from the fourth to the third speed ratio or from the fourth to the second speed ratio, bringing about engine racing and shift shocks, thus making it very difficult to provide an appropriate shifting timing.

Therefore, the conventional automatic transmission has needed a set of an orifice and an orifice control valve for coping with select shocks and another set of an orifice and and orifice control valve for coping with shift shocks taking place in shifting from the fourth to the third speed ratio and from the fourth to the second speed ratio. Besides, it is desired that the orifice for coping with select shocks should become operative only when said clutch is to be engaged (that is, a one-way orifice). This is because releasing this clutch is delayed in selecting N range from D range if this orifice is a fixed orifice, bringing about a fear that a vehicle continues to run even after selection is made to N range. As will be understood from the above description, the conventional hydraulic control system has needed the one-way orifice, the fixed orifice, and a plurality of orifice control valves for controlling them, resulting in a complicated and bulky construction and pushing up cost.

SUMMARY OF THE INVENTION

An object of the present invention is to improve a hydraulic control system such that, with a single orifice control valve, a clutch can be engaged with different timings for suppressing not only select shocks when a manual valve is shifted to a forward drive range from a neutral range, but also shift shocks taking place in a shifting between speed ratios involving engagement of the clutch.

More specifically, an object of the present invention is to provide a hydraulic control system of the above mentioned type which ensures a quick discharge of hydraulic fluid from the clutch when the manual valve is shifted to the neutral range from the forward drive range.

Briefly, the above mentioned objects have been accomplished by a hydraulic control system according to the present invention which features in providing an orifice fluidly disposed in a passage that allows fluid supply of hydraulic fluid pressure to a clutch in selecting a forward drive range from a neutral range and in shifting between speed ratios involving engagement of the clutch in the forward drive range, and an orifice control valve having means for providing a one-way flow bypass passage bypassing the orifice in selecting the forward drive range from the neutral range and providing a restricted flow bypass passage bypassing the orifice in shifting between speed ratios involving engagement of the clutch in the forward drive range.

BRIEF DESCRIPTION OF THE DRAWINGS

FIGS. 2(a), 2(b), 2(c) and 2(d), when combined, are a hydraulic circuit diagram illustrating an embodiment of a hydraulic control system for an automatic transmission according to the present invention;

DETAILED DESCRIPTION OF THE INVENTION

Referring to FIGS. 1 to 4 of the accompanying drawings, an embodiment of a hydraulic control system according to the present invention is described.

Figure 1:
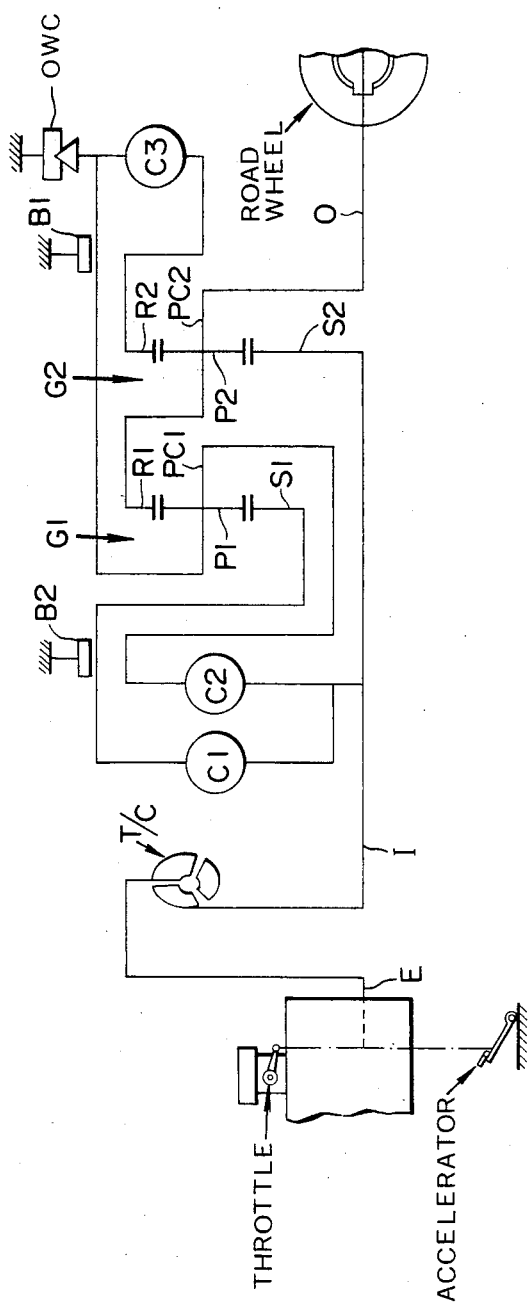
FIG. 1 is a schematic view of a power transmission mechanism of a four speed automatic transmission as illustrated with an engine having a throttle flap and an accellerator pedal.

FIG. 1 is a schematic diagram of a power transmission mechanism of an overdrive automatic transmission having four forward speeds and one reverse speed. This power transmission mechanism comprises an input shaft I to which a torque is transmitted from an engine output shaft E via a torque converter T/C, an output shaft O which transmits a driving force to a final drive, a first planetary gear set G1, a second planetary gear set G2, a first clutch C1, a second clutch C2, a third clutch C3, a first brake B1, a second brake B2, and a one-way clutch OWC. The first planetary gear set G1 comprises a sun gear S1, an internal gear R1, and a carrier PC1 supporting pinion gears P1 meshing simultaneosly with the sun gear S1 and the internal gear R1, while the planetary gear set G2 comprises a sun gear S2, an internal gear R2, and a carrier PC2 supporting pinion gears P2 meshing simultaneously with the sun gear S2 and the internal gear R2. The carrier PC1 is connectable via the clutch C2 to the input shaft I, while the sun gear S1 is connectable via the clutch C1 to the input shaft I. The carrier PC1 is connectable via the clutch C3 to the internal gear R2, too. The sun gear S2 is constantly connected to the input shaft I, while the internal gear R1 and the carrier PC2 are constantly connected to the output shaft O. The brake B1 is adapted to anchor the carrier PC1, while the brake B2 is adapted to anchor the sun gear S1. The one-way clutch OWC is so constructed and arranged as to allow a forward rotation of the carrier PC1 (i.e., a rotation in the same rotational direction as the engine output shaft E does), but it prevents a reverse rotation thereof (i.e., a rotation in the reverse rotational direction) (that is, it serves as a brake against the reverse rotation only).

In the above mentioned power transmission mechanism, selecting a combination of clutches C1, C2 and C3, brake B1 (one-way clutch OWC) and B2 will provide various rotational state of each of the rotary elements (S1, S2, R1, R2, PC1, and PC2) of the planetary gear sets G1 and G2, thus varying a rotational speed of the output shaft O as compared to rotational speed of the input shaft I. Forward four speed ratios and one reverse speed ratio are obtained by actuating the clutches C1, C2 and C3, and brakes B1 and B2 in various combinations as shown in the following Table.

TABLE

|  | C1 | C2 | C3 | B1 (OWC) | B2 | Gear Ratio | $\alpha1 = 0.45$ $\alpha2 = 0.45$ |
|---|---|---|---|---|---|---|---|
| 1st speed |  |  | o | o |  | $\frac{1+\alpha2}{\alpha2}$ | 3.22 |
| 2nd speed |  |  | o |  | o | $\frac{\alpha1+\alpha2}{\alpha2(1+\alpha1)}$ | 1.38 |
| 3rd speed | o | o |  |  |  | 1 | 1 |
| 4th speed |  | o |  |  | o | $\frac{1}{1+\alpha1}$ | 0.69 |
| Reverse | o |  | o |  |  | $-\frac{1}{\alpha1}$ | −2.22 |

In the above Table, a sign "o" denotes actuation state of clutch or brake, α1 and α2 each designating a ratio of number of teeth of the internal gear R1 or R2 to number of teeth of the corresponding sun gear S1 or S2, and a gear ratio is a ratio of the revolution number of the input shaft I to that of the output shaft O. What is denoted by a label (OWC) below the brake B1 means that the first speed ratio is established owing to the action of the one-way clutch OWC even if the brake B1 is not applied. However, in this first speed ratio, it is not possible for the output shaft O to drive the engine (that is, no engine braking is effected).

Referring now to FIGS. 2(a), 2(b), 2(c) and 2(d), a hydraulic control system is described which is designed to control the power transmission mechanism shown in FIG. 1.

This hydraulic control system comprises a regulator valve 2, a manual valve 4, a throttle valve 6, a throttle fail-safe valve 8, a throttle modulator valve 10, a pressure modifier valve 12, a cut back valve 14, a line pressure booster valve 16, a governor valve 18, a 1-2 shift valve 20, a 2-3 shift valve 22, a 3-4 shift valve 24, a 2-4 timing valve 26, an orifice control valve 27, a 2-3 timing valve 28, a 3-4 timing valve 30, a 3-2 timing valve 32, a first manual range pressure reducing valve 34, a 1-2 accumulator 38, a 4-3 accumulator 40, and an overdrive inhibitor solenoid 42, and these valves are interconnected as shown in FIGS. 2(a), 2(b), 2(c) and 2(d) and connected also with an oil pump O/P, the torque converter T/C, clutches C1, C2 and brakes B1 and B2 as shown. The brake B2 has a servo apply chamber S/A, i.e., a hydraulic fluid pressure chamber designed to apply the brake when pressurized, and a servo release chamber S/R, i.e., a hydraulic fluid pressure chamber designed to release the brake when pressurized. (Since the servo release chamber S/R has a larger pressure acting area than a pressure acting area of the servo apply chamber S/A, the brake B2 is released when the hydraulic fluid pressure is supplied to the servo release chamber S/R irrespective of supply of hydraulic fluid pressure to the servo apply chamber S/A.) The overdrive inhibitor solenoid 42 is electrically connected with an overdrive inhibitor switch SW. According to this arrangement, the clutches C1, C2 and C3 and brakes B1 and B2 are actuated as shown in the above mentioned Table depending upon vehicle speed and throttle opening of the engine.

The hydraulic control system is similar to a prior proposed hydraulic control system disclosed in copending U.S. patent application Ser. No. 518,413 filed on July 29, 1983 by Kazuhiko SUGANO now U.S. Pat. No. 4,563,918 issued on Jan. 14, 1986 which has been assigned to the common assignee of the present application. This copending application is incorporated hereby by reference in its entirety. Particulary, attention is directed to FIGS. 2(a), 2(b) and 2(c) and the description along therewith.

In the following description, only that portion of the hydraulic control system which is directly related to the present invention is described, and detailed description of the other portion is omitted. The omitted portion is substantially the same as the counterpart in the incorporated copending U.S. patent application Ser. No. 518,413. For information, the constituent parts designated by the reference numerals are listed as follows: What are designated by the reference numerals 102, 104, 106, 108, 110, 112, 114, 116, 120, 122, 124, 126, 128, 130, 132, 134 and 136 are valve bores, what are designated by the reference numerals 102a to 102j, 104a to 104f, 106a to 106f, 108a to 108e, 110a to 110e, 112a to 112e, 114a to 114g, 116a to 116f, 120a to 120k, 122a to 122j, 124a to 124k, 126a to 126e, 130a to 130e, 132a to 132e, 134a to 134e, and 136a to 136e are ports, what are designated by the reference numerals 138 and 140 are cylinder bores, what are designated by the reference numerals 202, 203, 204, 206, 210, 212, 214, 215, 216, 220, 221, 222, 224, 226, 228, 230, 232, 234 and 236 are spools, what are designated by the reference numerals 202a to 202d, 203a to 203b, 204a to 204b, 206a to 206c, 208a, 210a to 210c, 212a to 212b, 214a to 214c, 215a to 215b, 216a to 216c, 220a to 220c, 221a to 221d, 222a to 222e, 224a to 224d, 226a to 226c, 228a to 228c, 230a to 230c, 232a to 232c, 228a to 228c, 236a to 236b are lands, the reference numeral 209 designates a plunger, the reference numeral 208 designates a sleeve, the reference numerals 223 and 225 designate plugs, the reference numerals 238 and 240 designate pistons, the reference numerals 252 designates a sleeve, the reference numerals 252a to 252c designates ports, the reference numeral 254 designates a spring seat, what are designated by the reference numerals 302, 306, 307, 308, 310, 312, 316, 320, 322, 324, 328, 330, 332, 334, 336, 338 and 340 are springs, what are designated by the reference numerals 402, 404, 406, 408, 409, 410, 411, 412, 414, 416, 418, 420, 422, 424, 426, 428, 430, 432, 434, 436, 438, 440, 442, 444, 446, 448 and 450 are conduits, what are designated by the reference numerals 502, 504, 506, and 508 are shuttle valves, what are designated by the reference numerals 602, 604, 606, 608, 610, 612, 614, 616, 618, 620, 622, 624, 626, 628, 630, 650, 652, 654, 656 and 658 are orifices, what are designated by the reference numerals 750, 752, 754, 756 and 758 are check valves.

Figure 2B:
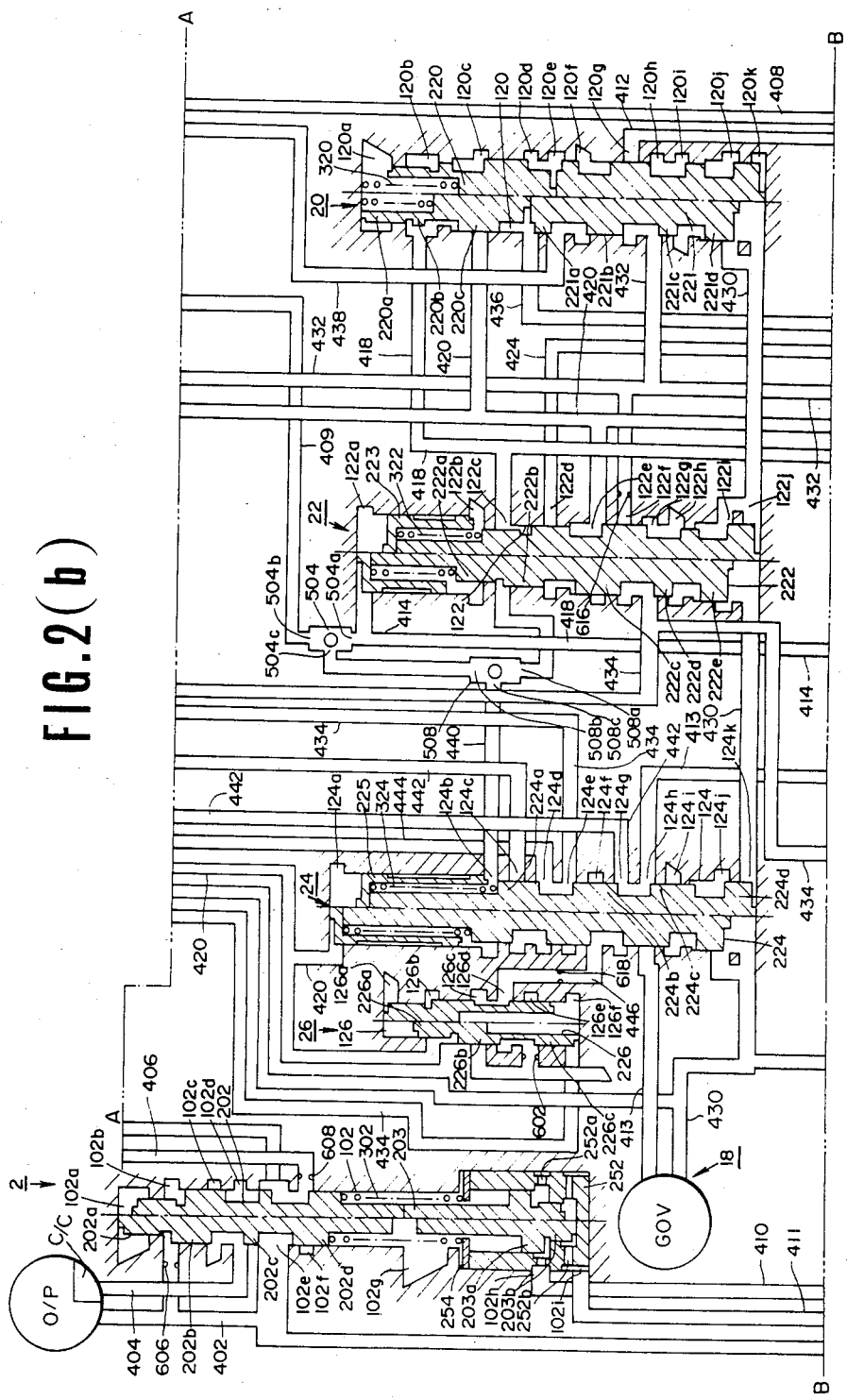
Figure 2C:
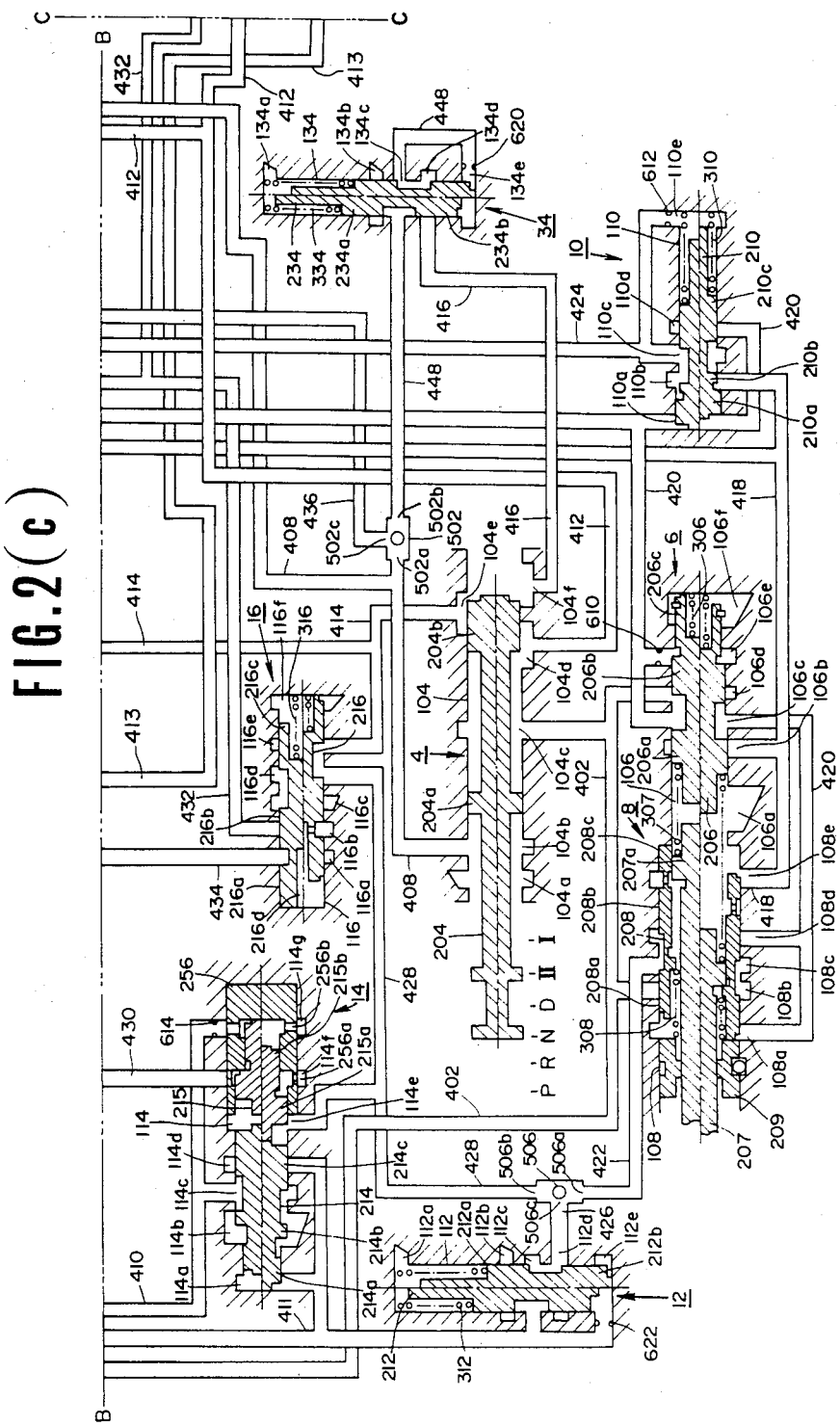
Figure 3:
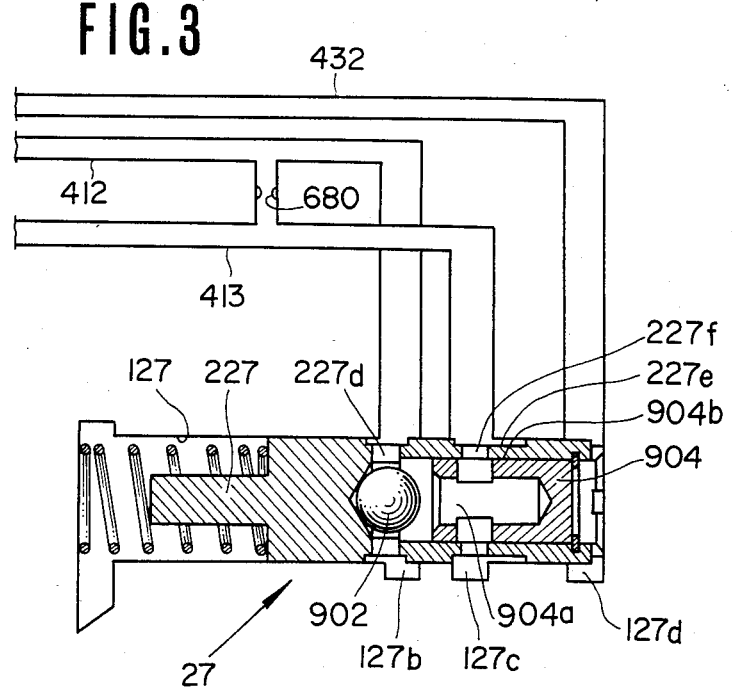
FIG. 3 is a view similar to FIG. 2(d) showing positions which component parts of an orifice control valve assume in selecting N range from D range.
Figure 4:
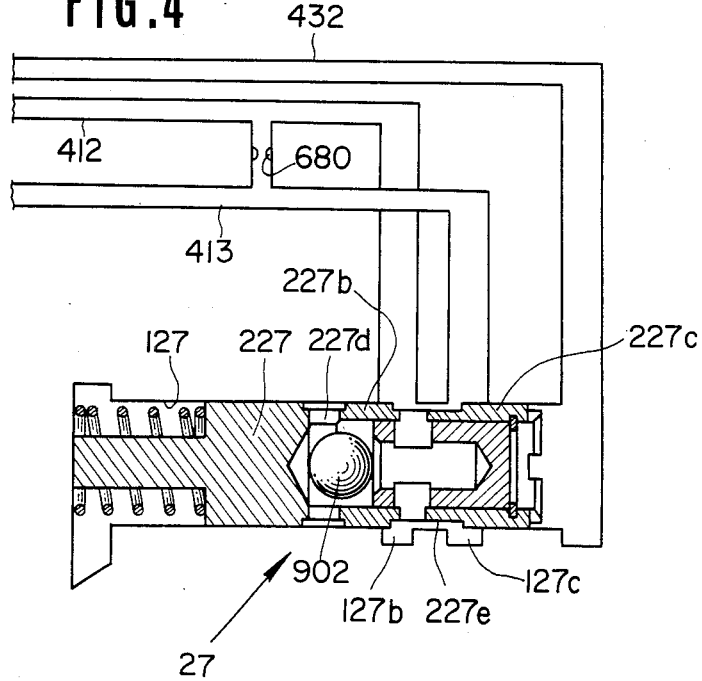
FIG. 4 is a view similar to FIG. 2(d) illustrating positions which component parts of the orifice control valve assume in shifting from the fourth to third speed ratio or from the fourth to the second speed ratio.

The hydraulic control system of the present application is different from the prior proposed hydraulic control system shown in FIGS. 2(a), 2(b) and 2(c) of the incorporated copending U.S. patent application Ser. No. 518,413 in that an orifice 680 is fluidly disposed in a passage defined by conduits 412 and 413 which establish a fluid flow communication between a port 104d of the manual valve 4 and a port 124h of the 3–4 shift valve 24, while in the prior proposed system, no such orifice is fluidly disposed in a passage defined by a conduit 412 which establishes fluid flow communication between a port 104d of a manual valve 4 and a port 124h of a 3–4 shift valve 24. Another difference is in the provision of the orifice control valve 27 fluidly connected to the conduits 412 and 413 bypassing the orifice 680 and is operatively connected to the conduit 432 connected to an outlet port 120h of the 1–2 shift valve 20. Briefly describing, the orifice control valve 27 is shiftable between a position set by a spring 327 during operation with the first speed ratio because no hydraulic fluid pressure appears in the conduit 432 under this condition and another position during operation with second, third and fourth forward speed ratios other than the first speed ratio because hydraulic fluid pressure is present or appears in the conduit 432. In the spring set position, a one-way (unrestricted) flow bypass passage bypassing the orifice 680 is provided, which one-way flow bypass passage is defined by port 127c, circumferential groove 227e, radial holes 227f, radial holes 904b, axial bore 904a, one-way valve 902, radial holes 227d and port 127b (see FIG. 3). In the other position as shown in FIG. 4, a restricted flow bypass passage bypassing the orifice 680 is provided, which restricted flow bypass passage is defined by port 127b, circumferential groove 227e and port 127c (see FIG. 4).

Referring to FIG. 2(d), the orifice control valve 27 comprises a valve bore 127 having four ports 127a to 127d, a spool 227 having three lands 227a to 227c and a spring 327 biasing the spool 227 to the right as viewed in this FIG. 2(d). The port 127a is a drain port, the port 127b communicates with the conduit 412 which is always supplied with hydraulic fluid pressure when the manual valve 4 is in the forward drive range positions. The port 127c is connected to the conduit 413 which communicates with the port 224c of the 3–4 shift valve 24. The conduit 412 and the conduit 413 communicate with each other via an orifice 680. The port 127d communicates with a conduit 432 which is supplied with hydraulic fluid pressure when the 1–2 shift valve 20 assumes an up position thereof (i.e., during operation with the second speed ratio and higher speed ratios). The spool 227 has a ball 902 disposed in an inner diameter portion thereof and a plug 904. The plug 904 is held in the illustrated position by means of a C-ring 906. The plug 904 is formed with an axial bore 904a and radial holes 904b. The ball 902 is seatable on an inlet to the axial bore 904a. The spool 227 is also formed with radial holes 227d between two lands 227a and 227b, and with another radial holes 227f at a circumferential groove 227e defined between the lands 227b and 227c. Outer diameter of the groove 227e is slightly smaller than outer diameter of the lands 227b and 227c. This provides a small clearance between the valve bore wall 127 and the groove 227e which is small enough to provide a throttle effect.

A description is now made as to how this embodiment operates.

First of all, operation in selecting D range from N range is described. When the manual valve 4 is shifted from N range position to D range position for the purpose of starting a vehicle which is at a standstill, line pressure is supplied to the conduit 412. Since the 1–2 shift valve 20 stays in a down position thereof under this condition, no hydraulic fluid pressure is applied to the conduit 432, the orifice control valve 27 assumes the illustrated position as shown in FIG. 2(d) owing to the action of the spring 327. This allows the hydraulic fluid pressure in the conduit 412 to be delivered via the port 127b and the radial holes 227d to act upon the ball 902, urging the ball 902 to seat on the inlet to the axial bore 904a formed through the plug 904. This brings about a state where the port 127b is prevented from communicating with the port 127c, thus allowing the hydraulic fluid pressure in the conduit 412 to be supplied to the conduit 413 only via the orifice 680. The hydraulic fluid pressure supplied to the clutch C3, therefore, gradually rises, engaging the clutch C3 taking a relatively long time. As a result, select shocks taking place when the automatic transmission shifts from neutral state to the first speed ratio state are rendered very small.

Next, operation when the manual valve 4 is selected from D range position to N range position is described. In this case, the conduit 412 is drained via the manual valve 4 and hydraulic fluid pressure discharged from the clutch C3 is supplied to the conduit 413. This causes the hydraulic fluid pressure in the conduit 413 to be conveyed via the port 127c, the radial holes 227f, the radial holes 904b and the axial bore 904a to act upon the ball 902, urging the ball 902 to disengage from the seated position to the illustrated position as shown in FIG. 3. This brings about a state where hydraulic fluid pressure in the conduit 413 is conveyed, without being subject to the throttle effect, via the port 127c, the radial holes 227f, the radial holes 904b, the axial bore 904a, the radial holes 227d and the port 127b to be discharged into the conduit 412. The clutch C3, therefore, is quickly released to establish the neutral state when D range position is selected from N range position. This prevents the vehicle from continuing to run even after the manual valve 4 has been shifted to N range position.

Next, operation in shifting from the fourth to the third speed ratio or from the fourth to the second speed ratio is described. As shown in the previous Table, the clutch C3 is released during operation with the fourth speed ratio, but is engaged during operation with the third or second speed ratio. Therefore, hydraulic fluid pressure is supplied from the conduit 412 to the conduit 413 in shifting from the fourth to the third speed ratio or from the fourth to the second speed ratio. In this case, since the 1-2 shift valve 20 stays in the up position thereof, hydraulic fluid pressure is still supplied to the conduit 432, urging the spool 227 of the orifice control valve 27 to assume the illustrated position as shown in FIG. 4. This allows the port 127b and the groove 227e of the spool 227. Since the clearance formed between the valve bore 127 and the groove 227e is small enough to provide an orifice effect as previously described, the hydraulic fluid pressure in the conduit 412 is gradually conveyed to the conduit 413. Of course, the hydraulic fluid pressure in the conduit 412 is conveyed to the conduit 413 via the orifice 680, too. In the above described manner, the hydraulic fluid pressure is delivered past also through the clearance defined between the valve bore 127 and the groove 227e, thus allowing the hydraulic fluid pressure to rise at a relatively quicker rate than the case where the hydraulic fluid pressure is delivered via the orifice 680 only in selecting from N range to D range. (Of course, since the clearance between the valve bore 127 and the groove 227e is small, the hydraulic fluid pressure rises at a gradual rate as compared to the case where there is no throttle effect.) A speed at which the clutch C3 is engaged in this case can be set to any desired value by determining the flow cross sectional area of the passage between the valve bore 127 and the groove 227e appropriately. As a result, each of the shiftings from the fourth to the third speed ratio and from the fourth to the second speed ratio can be effected at any desired shifting timing.

According to the above described control, therefore, the clutch C3 is engaged at the most gradual rate in selecting from N range to D range owing to the effect of the orifice 680, the hydraulic fluid pressure in the clutch C3 is quickly discharged in selecting from D range to N range, and the clutch C3 is engaged at the desired rate owing to the throttle effect provided by the clearance between the valve bore 127 and the groove 227e in shifting from the fourth to the third speed ratio and from the fourth to the second speed ratio. Therefore, it has now been made possible to set action of the clutch C3 independently for selecting from N range to D range, selecting from D range to N range and for shifting from the fourth to the third speed ratio (or from the fourth to the second speed ratio).

Although, in the above described embodiment, the present invention has been applied to the clutch C3 which is kept engaged during operation with the first, second and third speed ratio and is released during operation with the fourth speed ratio, the invention may be applied to a clutch and the like which is for example engaged during operation with the first and second speed ratio and is released during operation with the third and fourth speed ratio. That is, the present invention may be applied to any clutch as long as it is released during operation with a speed ratio other than the first speed ratio.

It will now be understood from the above description of the embodiment according to the present invention that, with the single orifice control valve 27, the clutch C3 is engaged at different timings and released quickly when desired.

What is claimed:

1. A hydraulic control system for an automatic transmission, the hydraulic control system supplying hydraulic fluid pressure to a clutch to engage same to establish a first forward speed ratio when entering a forward drive range from a neutral range, the hydraulic control system supplying hydraulic fluid pressure to the clutch when shifting between speed ratios involving engagement of the clutch after the forward drive range has been entered, the hydraulic control system discharging hydraulic fluid pressure from the clutch to establish a neutral setting when entering the neutral range from the forward drive range, said hydraulic control system comprising:

means defining a passage which supplies hydraulic fluid pressure to the clutch for entering the forward drive range from the neutral range and for shifting between speed ratios involving the engagement of the clutch after the forward drive range has been entered;

an orifice fluidly disposed in said passage and means for defining a bypass passage connected to said passage for bypassing said orifice, said bypass passage defining means including orifice control valve means for preventing fluid flow through said bypass passage when entering the forward drive range from the neutral range to establish the first forward speed ratio, and providing a restricted fluid flow through said bypass passage when shifting between speed ratios involving engagement of the clutch after the forward drive range has been entered.

2. A hydraulic control system for an automatic transmission, the hydraulic control system supplying hydraulic fluid pressure to a clutch to engage same to establish a first forward speed ratio when entering a forward drive range from a neutral range, the hydraulic control system supplying hydraulic fluid pressure to the clutch when shifting between speed ratios involving engagement of the clutch after the forward drive range has been entered, the hydraulic control system discharging hydraulic fluid pressure from the clutch to establish a neutral setting when entering the neutral range from the forward drive range, said hydraulic control system comprising:

means defining a passage which supplies hydraulic fluid pressure to the clutch for entering the forward drive range from the neutral range and for shifting between speed ratios involving the engagement of the clutch after the forward drive range has been entered;

an orifice fluidly disposed in said passage; and means for defining a bypass passage connected to said passage for bypassing said orifice, said bypass passage defining means including orifice control valve means for preventing fluid flow through said bypass passage when entering the forward drive range from the neutral range to establish the first forward speed ratio, and restricting fluid flow through said bypass passage when shifting between speed ratios involving engagement of the clutch after the forward drive range has been entered, wherein said orifice control valve means includes a valve bore formed with a first port connected to said passage on one side of said orifice and a second port connected to said passage on the opposite side of said orifice, a valve element slidably movable in said valve bore and a spring biasing said valve element, said valve element including a spool formed with three axially spaced lands defining a first circumferential groove between said first and second lands and a second circumferential groove between said second and third lands, said valve element being formed with an inside passage providing fluid flow communication between said first and second circumferential grooves, said valve element being biased by said spring to assume a spring set position wherein said first and second ports are allowed to communicate with said first and second circumferential grooves, respectively, said valve element being movable against said spring to another position wherein said first port is prevented from communicating with said first circumferential groove and is allowed to communicate with said second port via a clearance defined between said second circumferential groove and an adjacent wall of said valve bore, said clearance providing a flow restricting effect on fluid flow passing therethrough.

3. A hydraulic control system as claimed in claim 2, wherein said orifice control valve means includes a ball disposed in said inside passage.

4. A hydraulic control system for an automatic transmission, comprising:

hydraulic control system supply means for supplying hydraulic fluid pressure to a clutch to engage same to establish a first forward speed ratio when entering a forward drive range from a neutral range, the hydraulic control system supply means supplying hydraulic fluid pressure to the clutch when shifting between speed ratios involving engagement of the clutch after having entered the forward drive range, the hydraulic control system supply means discharging hydraulic fluid pressure from the clutch to establish a neutral setting when entering the neutral range from the forward drive range.

a portion which receives a predetermined hydraulic fluid pressure from said supply means during operation with all forward speed ratios except the first forward speed ratio, means defining a first passage which allows fluid supply of hydraulic fluid pressure to the clutch when entering the forward drive range from the neutral range and when shifting between speed ratios involving the engagement of the clutch after having entered the forward drive range;

an orifice fluidly disposed in said passage; and an orifice control valve having means for providing a one-way flow bypass passage connected to said first passage for bypassing said orifice when the predetermined hydraulic fluid pressure is absent from said portion of the hydraulic control system and providing a restricted flow bypass passage connected to said first passage for bypassing said orifice when the hydraulic fluid pressure is present in said portion of the hydraulic control.

* * * * *